Feb. 7, 1961 R. D. HARZA 2,970,803
VALVE SEAL
Filed July 22, 1957
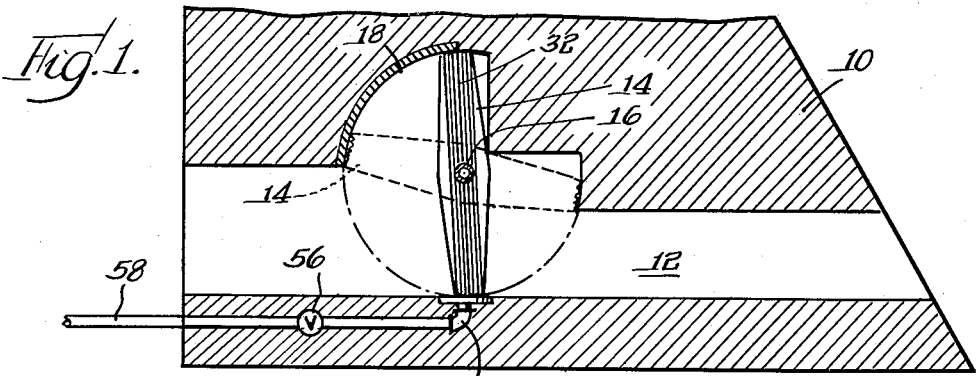
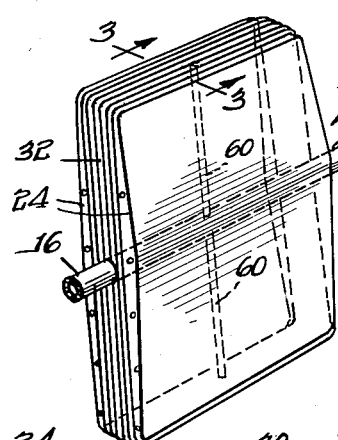
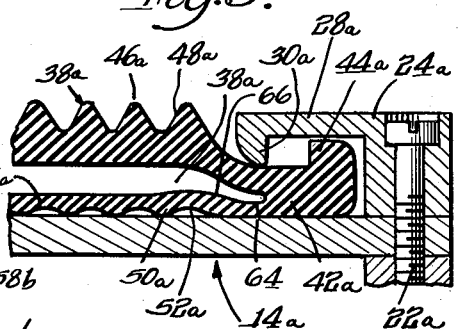
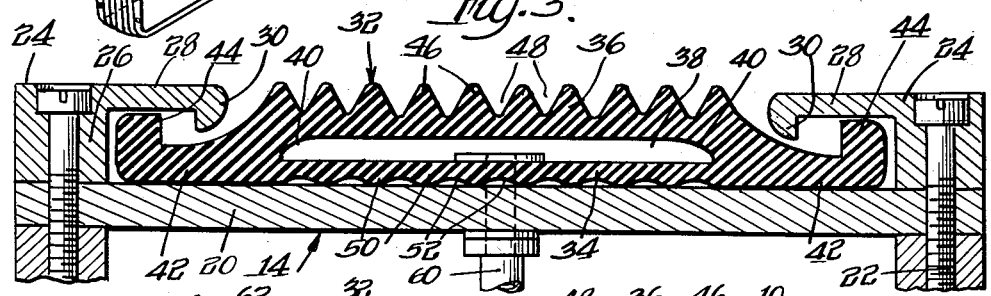
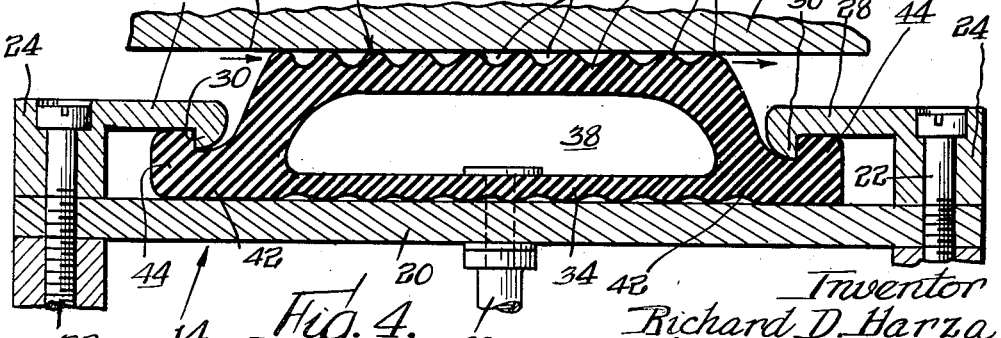
Inventor
Richard D. Harza
By: Olson & Trexler Attys United States Patent Office 2,970,803
Patented Feb. 7, 1961

2,970,803
VALVE SEAL

Richard D. Harza, Evanston, Ill., assignor to Harza Patents, Chicago, Ill., a partnership Filed July 22, 1957, Ser. No. 673,318

9 Claims. (Cl. 251—175)

This invention is concerned with a seal for controlling or preventing leakage of water past a valve gate or the like.

Various types of valves are utilized to control water or other fluid flow under many circumstances. Often, a rather high pressure is encountered, which makes sealing of a valve in closed position a difficult proposition. For example, butterfly valves may be utilized for controlling the passage of water from dams, as for use in power turbines, or for free discharge. Such an installation is illustrated in U.S. Patent 2,759,697, issued to my late father, Leroy F. Harza. Various types of flexible or resilient seals have been utilized in an effort to prevent leakage, but no such seal known to me has proved to be entirely satisfactory in operation.

Accordingly, it is the broad object of this invention to provide a new and improved seal for valves and the like.

More particularly, it is an object of this invention to provide a seal for valves in hydraulic installations wherein the pressure of the headwater is utilized to seal the valve.

More particularly, it is another object of this invention to utilize the headwater in a hydraulic installation to inflate a seal in a valve or the like.

Furthermore, it is an object of this invention to provide a valve or gate seal having a plurality of sequential sealing ridges or surfaces, whereby leakage pressure decreases across the sealing face of the seal, and hence is less than headwater pressure utilized to inflate the seal.

Specifically, it is an object of this invention to provide an inflatable seal having a succession of ridges arranged perpendicular to a leakage path, whereby effectively to seal off such leakage path.

Other and further objects and advantages of the present invention will be apparent from the following description when taken in connection with the accompanying drawings wherein:

Fig. 1 is a sectional view showing a butterfly valve mounted in a passageway in a dam and incorporating a seal constructed in accordance with the principles of this invention;

Fig. 2 is a perspective view of the valve incorporating the seal;

Fig. 3 is a cross-sectional view as taken substantially along the line 3—3 in Fig. 2 before inflation of the seal;

Fig. 4 is a view similar to Fig. 3, but showing the valve seal inflated;

Fig. 5 is a sectional view similar to the right hand section of Fig. 3, but showing a modification thereof; and Fig. 6 is a schematic view showing a motor and pump for applying inflating pressure to the seal.

Referring now in greater particularity to the drawings, and first to Fig. 1, there will be seen a hydraulic structure such as a dam 10 having a flow passage 12 therein. A butterfly valve 14 is arranged for pivoting about an axle 16 which can be vertical or horizontal, and which is illustrated as horizontal and at the top of the flow passage, and the upper or inner blade of the valve swings into a semi-circular recess or chamber 18 when the valve is in the closed position shown. The valve also is pivotal to an open position as shown in dashed lines. In accordance with the teachings of the aforesaid Leroy F. Harza Patent 2,759,697, the upper or inner valve blade (in closed position) is slightly larger than the lower or outer blade, whereby static water pressure holds the valve in closed position. The valve may be arranged for operation either hydraulically or mechanically, as in the aforesaid Harza patent, and the specific connections are not shown in the drawings.

The butterfly valve 14 is of generally rectangular outline, and the sides or faces thereof are slightly tapered, since in the illustration of the installation herein the flow passage 12 decreases in height across the valve. However, it is to be understood that the valve could have any other suitable outline, and would not necessarily have tapered faces. The valve 14 preferably is made of metal having suitable corrosion resistance properties, and includes end or side edge blades 20 (Figs. 3 and 4) which are bolted in place by means of bolts 22. The bolts 22 also secure retainers 24. The retainers include upstanding walls 26 having flanges 28 thereon extending toward one another and parallel to the blades 20. The flanges 28 are provided at their confronting ends with depending noses or hooks 30.

The essence of this invention resides in an inflatable valve seal 32, and its cooperation with the valve or gate previously described, particularly the retainers 24. The valve seal 32 is made of rubber-like material, preferably rubber, and is formed by known methods, such as casting, molding, or extruding. The valve seal 32 includes a back wall 34 and a front wall 36 spaced apart to provide a fluid channel 38. The edges of the front and back walls defining the edges of the fluid channel 38 are integrally joined together at beveled surfaces 40 and extend outwardly as flanges 42 having upstanding hook-like retaining ribs 44 thereon. As will be understood, the valve seal 32 extends completely around the edge of the butterfly valve or gate, as do the retainers 24. The flanges 42 and retaining ribs 44 more or less loosely underlie the flanges 28 and noses 30 of the retainers, whereby the seal is held in position capable of restricted movement, hereinafter to be set forth in greater detail.

The bearing seal is more or less in the nature of a web extending circumferentially around the valve or gate, and the outer wall 36 is provided with an outer sealing or wear surface in the nature of a succession of ribs 46 and intermediate valleys 48 extending parallel to the length of the web, and perpendicular to the direction of seepage when the valve is in closed position. Similarly, the back wall 34 is provided with alternate ribs 50 and intermediate valleys 52 extending in the direction of the length of the web. Generally speaking, the height of the ribs 46 may be somewhat greater than that of the ribs 50 as the major leakage path will be across the ribs 46, and the increased height allows better compression and sealing and wear.

The axle or shaft 16 about which the valve or gate 14 is pivoted is hollow, and is connected at one end to a pipe 54 leading through a valve 56 to another pipe 58 exposed to headwater pressure. As will be appreciated, any or all of the pipes could be replaced by hoses as dictated by sound engineering practice. The valve 56 preferably is remotely operable, and also preferably is located in a service passage or chamber for periodic inspection or repair. The hollow shaft or axle 16 is connected by one or more transverse pipes or passages 60 in the valve or gate 14 to the fluid channel 38 in the valve seal 32

Normally the valve seal 32 is in the more or less flat, collapsed state shown in Fig. 3. With the seal in this position, the valve or gate readily may be swung between open and closed positions and there will be considerable leakage. When the valve is in closed position, the valve 56 is opened to admit headwater pressure through the pipes 54 and 58 to the transverse pipes 60, and hence to the fluid channel 38. This causes the valve seal to expand as shown in Fig. 4, and presses the ribs 46 against a sealing surface 62 of the passage 12 through the dam 10. The expansion of the seal causes the edges thereof to pull in, so that the retaining ribs 44, which originally were spaced from the noses 30, are pulled in substantially against these noses, as may be seen with sequential reference to Figs. 3 and 4. As will be apparent, the outer ribs 46, and also the inner ribs 50, are pressed against their respective surfaces with a pressure equal to that of the headwater. Hence, the sealing force is substantially equal to the force tending to cause leakage across the first rib, leakage forces in this instance being assumed to be from left to right, as indicated by the arrows in Fig. 4. However, if there is any leakage past the first rib, there will be a pressure drop across this rib. Thus, the leakage force across the second rib is less than across the first rib. Accordingly, the sealing pressure is greater than that of the leakage pressure across the second rib, and there is less likely to be leakage. Furthermore, any leakage across the second rib is accompanied by a pressure drop, and the leakage pressure across the third rib thus is smaller relative to the sealing pressure than across the second rib and so forth. There is accordingly a more or less stepwise resistance to leakage, providing a somewhat tortuous leakage path, and effecting excellent resistance to leakage across the seal, between the valve or gate and the sealing surface of the passageway through the dam, such sealing surface preferably being provided by a liner of known or suitable construction.

A modification of the invention which may be found preferable under some circumstances is shown in Fig. 5. Similar numerals with the addition of the suffix *a* are utilized to identify similar parts in this figure, and hence extended description is unnecessary. The distinguishing feature is that the fluid channel 38a is extended farther over into the flange 42a, as at 64, and has a more tapered edge, including a reverse curve section 66 along the back wall 34a. Under certain conditions of seal expansion, a preferred shape and stress pattern will result. Action otherwise is the same as previously described.

As has heretofore been shown and described, the seal is expanded to sealing position by headwater pressure. Under certain circumstances it may be desirable to provide a greater sealing force, and in such instance the modification of Fig. 6 is resorted to. More specifically, the inlet pipe 58b is provided with water under greater than headwater pressure by a pump 68 receiving the water from a pipe 70, and driven by a motor 72.

As now will be apparent, I have provided an improved expansible or inflatable valve seal, preferably inflated by headwater pressure. The seal effectively seals against the valve or gate itself, and also against the gate liner, i.e. effectively filling the crack between the gate and liner and preventing leakage behind the seal. The stepwise sealing, or tortuous seepage path provided by the succession of ribs parallel to the length of the seal, and perpendicular to the seepage path provides effective sealing. As will be apparent, seepage past ribs subsequent to the first will necessarily be at pressures reduced below the static headwater pressure, whereas all sealing pressure is equal to the static headwater pressure. Leakage thus is controlled to acceptable limits, and complete stoppage of leakage can be obtained by the use of pressures higher than that of the static headwater, as by the motor driven pump.

The seal can be retracted to permit movement of the gate without seal friction or jamming. Partial sealing with but slight seal friction can be obtained by admitting partial headwater pressure to inflate the seal. The seal is thick enough to withstand wear and tear, and the rubberlike, elastic material used in the construction of the seal is long lived, and does not deteriorate from exposure to the water, and does not wear away rapidly with friction.

Although the seal has been described specifically with regard to hydraulic structures, it will be understood that the seal is capable of other uses, such as doors on pressurized air craft, and also in submarines and air locks, etc.

It is to be understood that the specific example of the invention as herein shown and described is for illustrative purposes only. Various changes in structure will no doubt occur to those skilled in the art, and are to be understood as forming a part of this invention insofar as they fall within the spirit and scope of the appended claims.

The invention is claimed as follows:

1. In combination with means defining an aperture having a sealing surface and a closure member therefor, there being a space between said closure member and said aperture sealing surface, said closure member having circumferential retaining means thereon, said retaining means comprising a pair of walls spaced outwardly from said closure member and having confronting edges with projections extending toward said closure member, an elongated seal in the form of a flat web extending circumferentially around said closure member, and fitting in the space between said closure member and said aperture sealing surface, said seal having edge portions lying between said walls and said closure member and having projections extending outwardly toward said walls and loosely interlocking behind the projections on said walls, said seal having a fluid channel extending longitudinally therethrough and having an external fluid connection for inflating said seal tightly to fill the space between said closure member and said aperture sealing surface, said seal upon inflation having the outer edges thereof drawn in toward one another whereby the projections on said seal approach the projections on said walls whereby to hold said seal in place on said closure member.

2. A seal as set forth in claim 1 wherein the web has an outer sealing face having a succession of alternate ribs and valleys thereon extending parallel to the length of said seal for forming a tortuous leakage path.

3. A seal as set forth in claim 2 wherein the seal also has an inner sealing surface engageable with said closure member, said inner sealing surface also having a succession of alternate ribs and valleys extending parallel to the length of said seal, the ribs on said inner surface being of lesser height than the outer ribs engageable with the aperture sealing surface.

4. In a hydraulic structure withstanding headwater pressure and having a passageway therethrough, a closure member movably mounted in said passageway and cooperable with a sealing surface therein, said closure member when in closed position being spaced from said sealing surface, an elongated seal circumferentially encircling said closure member and fitting in the space between said closure member and said sealing surface, said seal being in the form of a web having outwardly projecting edge flanges, said closure member having retainers overlying said outwardly projecting edge flanges and having inwardly directed edge flanges loosely embracing said seal, said seal having a fluid channel extending longitudinally therethrough and having an external fluid connection for conveying headwater pressure internally of said seal for inflating said seal tightly to fill the space between said closure member and said sealing surface, said seal having faces contacting said closure member and said sealing surface, said faces having thereon a succession of alternate ribs and valleys extending parallel to the length of said seal forming a tortuous seepage path, the flanges on said seal normally being spaced from the flanges on the retainers and being drawn toward said flanges upon inflation of said seal.

5. In combination with means defining an aperture having a sealing surface and a closure member therefor, there being a space between said closure member and said aperture sealing surface, said closure member having circumferential retaining means thereon, said retaining means comprising a pair of walls mounted on said closure member and having portions confronting one another and spaced from the closure member, an elongated seal in the form of a flat web extending circumferentially around said closure member, and fitting in the space between said closure member and said aperture sealing surface, said seal having edge portions lying between said walls and said closure member and beneath said confronting portions, said seal having a fluid channel extending longitudinally therethrough and having an external fluid connection for inflating said seal in order tightly to fill the space between said closure member and said aperture sealing surface, said seal upon inflation having the outer edges thereof drawn in toward one another whereby the edge portions thereof move relative to said walls but remain beneath the confronting portions thereof.

6. In a hydraulic structure withstanding headwater pressure and having a passageway therethrough provided with a sealing surface, a closure member movably mounted in said passageway between an open position and a closed position in spaced cooperative association with said sealing surface, an elongated seal in the form of a web circumferentially encircling said closure member and fitting in the space between said closure member and said sealing surface and having outwardly projecting edge flanges, means associated with said closure member for retaining the edge flanges in association therewith, said seal having a fluid channel extending longitudinally therethrough with an external fluid connection for conveying headwater pressure internally of the fluid channel to inflate the seal to tightly fill the space between the closure member and the sealing surface, said seal having faces contacting said closure member and said sealing surface with at least the face in contact with the sealing surface having thereon a succession of alternate ribs and valleys extending parallel to the length of the seal and forming a seepage path thereacross effecting a progressive pressure drop below headwater pressure across each rib with maintained headwater pressure in the fluid channel of the seal for resisting leakage of fluid entirely across the seal.

7. In a hydraulic structure as claimed in claim 6, wherein the face of the seal contacting the closure member also has a succession of alternate ribs and valleys extending parallel to the length of the seal.

8. In a hydraulic structure as claimed in claim 7, wherein the height of the ribs on the face contacting the sealing surface is greater than that of the ribs on the face of the seal contacting the closure member.

9. In a hydraulic structure as claimed in claim 6, wherein the retaining means between the edge flanges and the closure member includes mutually interengaging projecting portions loosely interfitted when the seal is collapsed and being drawn into engagement with one another upon inflation of the seal.

References Cited in the file of this patent

UNITED STATES PATENTS

| | | |
|---|---|---|
| 1,834,870 | Rogers | Dec. 1, 1931 |
| 2,271,777 | Nathan | Feb. 3, 1942 |
| 2,306,160 | Freyssinet | Dec. 22, 1942 |
| 2,814,514 | Beatty | Nov. 26, 1957 |

FOREIGN PATENTS

| | | |
|---|---|---|
| 435,059 | Great Britain | Sept. 13, 1935 |
| 444,841 | Great Britain | Mar. 30, 1936 |